Feb. 20, 1968   W. H. HULTGREN ET AL   3,369,666
FILTER UNIT WITH ANTI-DRAIN BACK VALVE MEANS
Filed Sept. 22, 1965   2 Sheets-Sheet 1
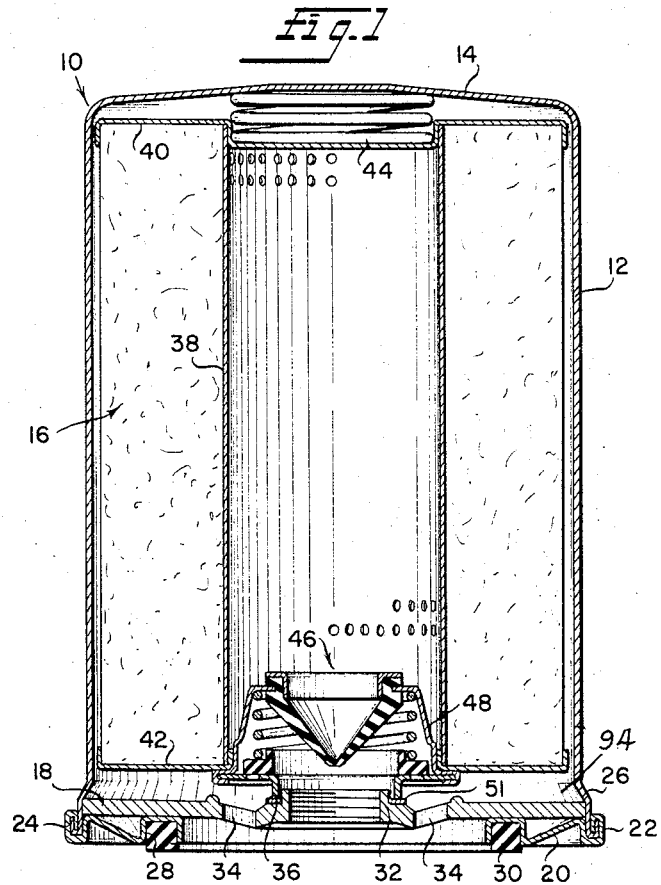
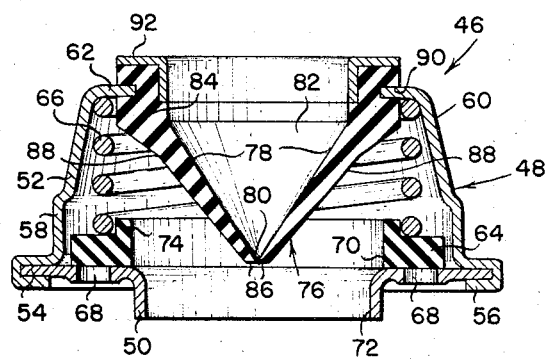
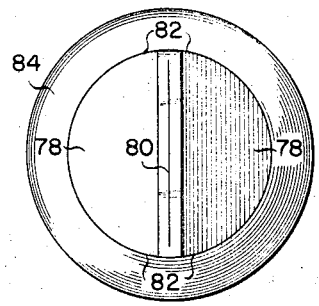
INVENTORS
*William H. Hultgren*
*Robert MacGregor*
BY *Lawrence J. Winter*
ATTORNEY Feb. 20, 1968 W. H. HULTGREN ET AL 3,369,666
FILTER UNIT WITH ANTI-DRAIN BACK VALVE MEANS
Filed Sept. 22, 1965 2 Sheets-Sheet 2

INVENTORS
William H. Hultgren
Robert MacGregor

BY Lawrence J Winter

ATTORNEY

United States Patent Office 3,369,666
Patented Feb. 20, 1968

3,369,666
FILTER UNIT WITH ANTI-DRAIN
BACK VALVE MEANS
William Herbert Hultgren, Mount Carmel, and
Robert MacGregor, Olney, Ill., assignors to Champion Laboratories, Inc., West Salem, Ill., a corporation of Connecticut
Filed Sept. 22, 1965, Ser. No. 489,155
5 Claims. (Cl. 210—130)

The present invention relates to a filter unit and more particularly to a filter unit in which is disposed an anti-drain back valve and a by-pass valve.

The present invention further relates to an oil filter unit that is what is commonly known as a throwaway spin-on type filter unit, that is disposed directly on the engine block of an engine. The oil filter unit is adapted to receive the total or full flow of all of the oil from the engine In accordance with the present oil filter unit described in this invention, the oil pump of the internal combustion engine forces the oil out of the engine block and into the oil filter unit which is mounted on the engine block, but on its outside surface. The oil is passed through the filter cartridge disposed within the filter unit and the dirt and contaminants from the stream of oil passing through the filter unit is removed so that clean oil passes back into the engine block.

In accordance with the present invention, the total flow of oil is circulated through the filter unit, as distinguished from what is commonly known as a part flow oil filter unit in which only a fraction of the oil from the engine is progressively filtered through the oil filter, with the remaining portion or fraction of the oil by-passing the filter unit. In this total flow or full flow type of oil filter, it is necessary to provide some means to by-pass the oil around the filter cartridge that is enclosed within the filter housing in order to prevent the engine from becoming starved of oil, should the oil filter become clogged from contaminants. Generally, a by-pass valve is provided within the filter unit housing so that the oil can short-circuit the filter cartridge and by-pass flow through the filter cartridge should the cartridge be contaminated for any reason, or should the filter cartridge offer an excessive resistance to flow, for example, upon the cold starting of an engine where temperatures are low.

The throwaway spin-on full flow oil filter unit also is provided with an anti-drain back valve or a one-way valve in order to prevent oil from the engine parts from leaking back through the filter housing to the oil reservoir or to the engine crank case when the engine is not operating, so that upon starting the engine later on, the engine parts will not be starved of oil and oil will immediately flow to properly lubricate the engine parts.

It is an object of the present invention to provide a full flow spin-on type oil filter unit that is directly connected or mounted upon the engine block of an internal combustion engine and the like, which oil filter unit has a normal flow path therethrough so that the oil is properly filtered by an oil filter cartridge encased within the housing, and is further provided with a by-pass or secondary oil flow path so that the oil may be by-passed or short-circuited around the filter cartridge should it become clogged.

It is another object of the present invention to provide a full flow oil filter unit having anti-drain back valve means and by-pass valve means disposed in the filter housing and providing two separate or independent flow paths through the filter housing.

It is another object of the present invention to provide the combination of an anti-drain back valve and a by-pass valve assembly that can be readily inserted into a spin-on full flow oil filter as a single unit and which does not have to be permanently secured to the filter element or filter cartridge of the oil filter unit.

It is another object of the present invention to provide a combination by-pass and anti-drain back valve assembly in which the anti-drain back valve assembly consists of a resilient member.

It is another object ol the present invention to provide an anti-drain back valve for an oil filter unit which completely eliminates moving parts, such as a valve disk held closed by biasing means, which anti-drain back valve has been commonly used theretofore.

It is another object of the present invention to provide an anti-drain back valve that may be made entirely of elastomeric material.

It is another object of the present invention to provide a full flow spin-on type filter unit that is provided with an anti-drain back valve that has a natural free state configuration, and in which deformation of the valve will cause it to open, while a decrease in oil pressure that causes the valve to open will then permit the valve to return to its natural free state configuration and in which state it is in a closed position.

It is another object of the present invention to provide an anti-drain back valve that can be readily disposed within the by-pass valve means of the filter unit so that it will offer less resistance to oil flow therethrough and will not in any way cause undue restriction through either of the valve flow paths so that the serviceable life of the filter element is not reduced, since the valve offers a minimum restriction to oil flow, to the total restriction encountered across the filter element or cartridge.

It is another object of the present invention to provide an anti-drain back valve that can be impregnated with particles or can have magnetic particles dispersed therein so that the valve is provided with a magnetic seal, in addition to its other characteristics that cause the valve to be maintained normally in a closed position.

It is another object of the present invention to provide an anti-drain back valve for a filter unit having a configuration and being made of resilient material so that it is normally closed off until pressure is applied against the valve to cause it to open.

It is another object of the present invention to provide an elastomeric type of anti-drain back valve utilizing material with magnetic properties dispersed therein so as to prevent leakage at the lips of the valve which normally return to their original position, forming a tight seal and preventing return flow of oil through the filter unit.

It is another object of the present invention to provide an anti-drain back valve that is economical to make and has no moving parts so that it requires no maintenance and is substantially foolproof in operation because of the fact that it does not have any moving parts.

Various other objects and advantages of the present invention will be readily apparent from the following detailed description when considered in connection with accompanying drawings forming a part hereof and in which:

FIGURE 1 is a vertical sectional view of an oil filter unit embodying the present invention;

FIGURE 2 is an enlarged sectional view of the anti-drain back valve means and the by-pass valve means shown in FIGURE 1;

FIGURE 3 is a bottom plan view of the resilient anti-drain back valve shown in FIGURE 2;

Figure 4:
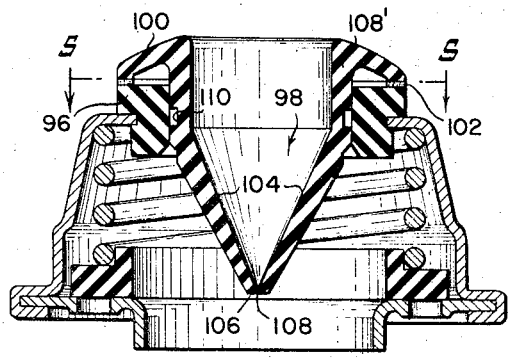
FIGURE 4 is a view similar to FIGURE 2 but illustrating another embodiment of the present invention.

Referring to the drawings, the reference numeral 10 generally designates an oil filter unit having a cylindrical casing or housing 12 provided with an upper closed end 14 and in which is encased a filter element or cartridge 16. The bottom of the cylindrical housing or casing 12 is closed off by a closure member or circular plate 18. The plate 18 is disposed within the lower end of the casing 12 by a retainer plate 20 disposed against the bottom of the closure member 18. The annular retainer plate 20 is provided with an outwardly and upwardly turned lip 22 that is rolled over a complementary lip 24 disposed on the bottom edge of the casing 12 so as to form a rolled seam. It will be noted that the outer edge of the closure member 18 is prevented from moving upwardly in the casing 12 by a flared portion 26 of the casing.

The retainer plate 20 may be tack welded at various points to the closure member 18. The inner periphery of the retainer plate 20 is provided with an annular recess 28 that is substantially square shaped in cross section. A resilient gasket 30 is disposed within the recess 28 so as to form a liquid tight seal against the block of an engine when the filter unit is secured thereto.

The central portion of the closure member 18 is provided with an inturned threaded nipple or bushing 32 forming a central oil outlet opening therein. The nipple 32 is also provided with a substantially horizontal annular shoulder 36 therearound and a plurality of circumferentially spaced oil inlet openings or ports 34 are disposed in the closure member radially outwardly of the nipple and the shoulder 36, and radially inwardly of the gasket member 30.

The filter element or cartridge 16 is preferably of a well known resin impregnated pleated paper disposed around a perforated center tube 38 and has its opposite ends sealed off by end caps 40 and 42. The end cap 40 closes off the adjacent end of the center tube and a spring 44 is disposed in a recess formed in the end cap 40 so as to maintain the filter element 16 in a seated position in the filter housing.

The combination or assembly of the by-pass valve means and the anti-drain back valve means embodied in the present invention is generally designated as 46 and consists of an integral or single unit that can be inserted within the ends of the center tube 38 as best seen in FIGURE 1. The valve assembly 46 also serves as a filter support member 48. The filter support member 48 comprises a sleeve 50 which is seated on a ring gasket member 51 that is disposed on the shoulder 36 around the nipple 32 so as to form an oil tight or liquid tight seal with the closure member 18. The sleeve 50 is of slightly larger size or diameter than the outside diameter of the nipple 32 so that it can be readily mounted over the nipple 32. The sleeve 50 extends above the upper edge of the nipple 32 and thereafter extends in a horizontal direction outwardly away from the nipple 32 a substantial distance so as to provide a horizontal annular flange or rim 54. The horizontal rim 54 provides a seat adjacent its outer periphery for the inner end of the filter cartridge 16 and the center tube 38 as best shown in FIGURE 2.

The valve assembly 46 is provided with an outer casing or sleeve 52 that is provided with a reverse bend 56 adjacent its lower edge which reverse bend clamps the sleeve 52 to the horizontal rim 54 as best seen in FIGURE 2. The sleeve 52 has a vertical section or portion 58 adjacent the reverse bend 56 and thereafter is inclined upwardly at 60, and terminates in an inturned horizontal rim 62. The casing or sleeve 52 forms a chamber in which is disposed a by-pass valve consisting of a by-pass valve disk 64 and a biasing spring 66. The horizontal rim portion 54 of the sleeve 50 is provided with a plurality of circumferentially spaced oil by-pass ports 68 therein and the annular by-pass valve disk 64 is disposed on the rim 54 to cover these ports 68. The valve disk is positioned so that its central opening 70 therein is in alignment with the opening 72 formed by the sleeve 50. The inner periphery of the disk 64 is provided with a vertical projection 74 so that the lower end of the spring 66 can be mounted therearound, as best seen in FIGURE 2. The upper end of the biasing spring 66 is disposed to seat against the under surface or the inner surface of the inturned rim 62.

The anti-drain back valve is generally designated 76 and is made of elastomeric material such as rubber, neoprene, or the like. The valve 76 has the general configuration of a duck bill. Referring to FIGURES 2 and 3, it will be seen that the valve is provided with two planar or flat parallel sides 78 which converge to a knife edge 80 forming lips between which the oil flows from the downstream side of the filter cartridge 16 through the outlet openings 70 and 72. The sides of the valve opposite the flat planar side 78 are cylindrical as indicated at 82. The lip portion or knife edge portion 80 of the valve is disposed within the by-pass valve 64 and the opposite end of the valve 76 is substantially cylindrical as indicated at 84 and is of a greater thickness than the duck bill portion. It will be noted that the side portions 78 are gradually tapered in thickness and in cross-section so that their ends 86 forming the lips of the valve are substantially thinner than the opposite end indicated at 88.

The thick cylindrical portion 84 of the valve is provided with a circumferential slot or recess 90 cut therein. The recess 90 is adapted to receive the inner end of the inturned rim 62. The anti-drain back valve 76 is press fitted into the assembly 46 by pressing the valve 76 into the sleeve 52 until the inturned flange or rim 62 is disposed within the circumferential recess 90 of the valve.

In the embodiment of the invention shown in FIGURE 2 it will be noted that the upper or outer end of the valve is provided with an L-shaped reinforcement member 92 that may be secured to the cylindrical portion 84 by any suitable means such as adhesive cement and the like.

When the oil filter unit has been properly secured to an engine block of an internal combustion engine, not shown, the unit is ready to be put in operation upon starting of the engine. When the engine is started, the engine oil pump will force oil through the oil inlet ports 34 and into the interior of the filter housing 12. The incoming oil will flow into the chamber 94 between the closure member 18 and the filter cartridge 16 and will thereafter pass around the outside of the cartridge and flow in an outside-in direction through the filter cartridge and pass into the center tube 38. The filter cartridge will remove any contaminants and dirt carried in the oil stream. After the oil passes through the center tube 38, it will flow through the interior of the anti-drain back valve 76 and the oil pressure will force the resilient valve to open with the ends 86 separating from each other and will permit the oil to pass into the openings 70 and 72 and out of the filter unit and back into the internal combustion engine through the central opening formed by the nipple 32. The duck bill configuration of the flexible anti-drain back valve 76 will permit the oil to flow only in one direction therethrough since the knife edge or lip edge 80 of the valve will prevent the oil from flowing in a reverse direction through the anti-drain back valve when the engine is shut down. At this time the lips will return to their free state original position, and form a tight seal and prevent the return of oil flow through the valve. It will be noted that the configuration of the duck bill valve does not require a biasing spring or any other means to return the valve to a closed state or position, but the inherent characteristics of the valve and its configuration cause the valve to normally be maintained in a closed position when the oil flow stops.

It will further be noted that the anti-drain back valve can be readily snapped into place by merely press fitting the valve into the assembly 46 so that the inturned rim 62 is disposed within the slot cut in the outer circumference or periphery of the cylindrical section 84 of the valve. Thus, the valve is of substantially a foolproof design, and requires no maintenance and can be readily and economically made from a molded resilient material.

The configuration of the duck bill valve and its position within the sleeve 52 provide a streamlined flow path with respect to the sleeve 52 when the by-pass valve 64 is open so that the valve will offer no undue restriction to the flow of oil through the filter unit when the filter elements becomes clogged.

When the filter element 16 becomes clogged so that the oil pressure entering the oil inlet ports 34 of the casing exceed a predetermined pressure because of the restricted flow through the filter element the oil pressure will then cause the by-pass valve disk 64 to unseat. The opening of the by-pass valve disk 64 will then permit the oil entering the inlet ports 34 to pass through the oil by-pass ports 68 and through the openings 70 and 72 and out of the nipple 32 back into the engine. Thus, the oil is short-circuited and the engine is prevented from being starved of engine oil in spite of the fact that the oil filter cartridge has become clogged.

Figure 5:
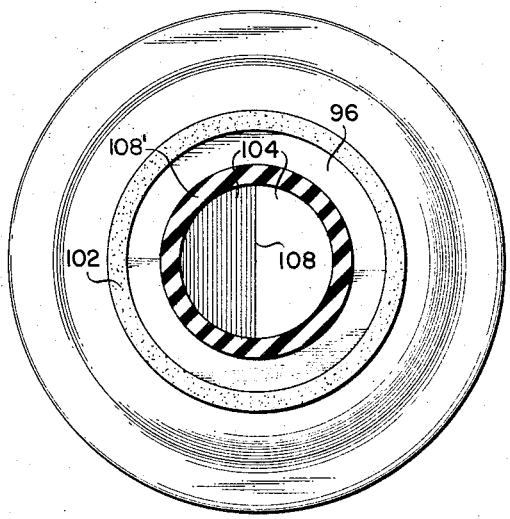
FIGURE 5 is a section taken along the line 5—5 of FIGURE 4.

In the modification of the invention shown in FIGURES 4 and 5, the anti-drain back valve is substantially the same as that described in connection with the embodiment shown in FIGURES 1, 2 and 3, except that the anti-drain back valve is provided with a hard resilient member 96 provided with a circumferential slot therein which is snap fitted into the assembly 46 by positioning it so that the flange 62 extends into the circumferential slot of the member 96 as shown in FIGURE 4. In this embodiment of the invention the valve is provided with the duck bill portion 98 formed separately from the portion 96 and disposed within the portion 96. The duck bill member has an outwardly flared rim 100 that is secured by a strip of adhesive cement 102 to the upper surface of the hard portion 96. The duck bill portion has the corresponding flat planar sides 104, which converge to provide an outlet end 106 formed by a slit 108 in the corresponding lips that form the outlet end 106. The duck bill portion 98 is also made of a resilient material but is of a softer consistency, or that is it is more flexible and pliable than the hard rubber portion 96. The cylindrical portion 108 of the duck bill is provided with a circumferential recess 110 therein. The operation of this embodiment of the invention is substantially the same as that described in connection with the embodiment shown in FIGURES 1 to 3.

Figure 6:
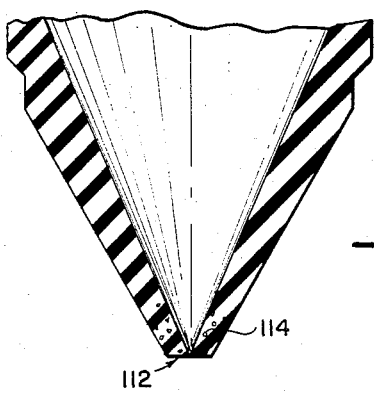
FIGURE 6 is a view of the anti-drain back valve embodied in the present invention provided with magnetic properties.

Referring to the embodiment of the invention shown in FIGURE 6, the duck bill portion 98 of the anti-drain back valve is substantially the same as that described in connection with the other embodiments except that the discharge end 112 of the flat planar sides is impregnated with or has a plurality of discrete magnetic particles 114 therein so that the flexible anti-drain back valve duck bill portion has magnetic properties and the lips will return to their original position and form a tight seal and prevent return flow of oil through the valve when the engine is stopped, with the magnetic particles enhancing the sealing characteristics of the valve. The particular method of impregnating or dispersing the magnetic particles in the rubber is not part of the invention, as it is well known to provide a magnetic seal utilizing magnetized rubber.

Thus, from the foregoing description it is readily apparent that the present invention provides a novel and useful and economical anti-drain back valve that has no moving parts but utilizes solely the resilient characteristics of elastomeric materials and the configuration of the anti-drain back valve to maintain the valve in a closed position when the pressure of oil does not force the valve to an open position.

From the foregoing description it will also be apparent that various changes may be made in the form, location and arrangement of the parts without departing from the spirit and characteristic of the invention, and it is to be understood that this invention is not to be limited except by the scope of the appended claims.

What is claimed is:

1. A spin-on throwaway type oil filter unit comprising a housing with a closure member closing off one end having a central opening therein formed by a threaded nipple for screwing onto an engine and discharging oil therethrough, oil inlet means in said closure member surrounding said nipple, and a filter support member mounted on said nipple forming a unitary structure provided with an anti-drain back valve and by-pass valve, said support member including a first sleeve with a substantially horizontal annular rim, an annular filter element with a center tube seated on said rim, another upwardly extending sleeve secured to said rim and extending into said center tube, by-pass port means in said rim, a by-pass valve seated over said port means and on said rim, biasing means normally urging said by-pass valve seated against said rim, the upper end of said upwardly extending sleeve having a central opening, a resilient anti-drain back valve secured to said upper end of said upwardly extending sleeve around its central opening, said anti-drain back valve having a depending cylindrical upper portion disposed within said upwardly extending sleeve and a converging lower portion extending downwardly therefrom and converging to a position located centrally of and substantially at the same level as said rim.

2. The filter unit of claim 1 wherein the lower portion of said anti-drain back valve comprises two planar converging sides provided with a slit at their point of convergence.

3. The filter unit of claim 2 wherein said anti-drain back valve is provided with magnetic particles therein adjacent the point of convergence.

4. The filter unit of claim 3 wherein said anti-drain back valve is secured to an inturned rim on said upwardly extending sleeve by a press fit.

5. The filter unit of claim 3 wherein a hard annular rubber member is press fitted into the central opening of said upwardly extending sleeve and said cylindrical portion is secured to said annular rubber member.

References Cited

UNITED STATES PATENTS

| | | | |
|---|---|---|---|
| 2,542,254 | 2/1951 | Lamb | 210—136 X |
| 2,589,766 | 3/1952 | Bradley | 210—222 X |
| 2,594,525 | 4/1952 | Walden et al. | 137—525.1 |
| 2,598,002 | 5/1952 | Langdon | 137—525.1 X |
| 2,959,832 | 11/1960 | Baermann | 210—222 X |
| 3,184,062 | 5/1965 | Humbert | 210—130 |
| 3,245,428 | 4/1966 | Klimax et al. | 137—525.1 X |

REUBEN FRIEDMAN, *Primary Examiner.*

W. S. BRADBURY, *Assistant Examiner.*